United States Patent
Ishihara et al.

(10) Patent No.: US 10,204,523 B1
(45) Date of Patent: Feb. 12, 2019

(54) AIRCRAFT SYSTEMS AND METHODS FOR MANAGING RUNWAY AWARENESS AND ADVISORY SYSTEM (RAAS) CALLOUTS

(71) Applicant: HONEYWELL INTERNATIONAL INC., Morris Plains, NJ (US)

(72) Inventors: Yasuo Ishihara, Kirkland, WA (US); Steve Johnson, North Bend, WA (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 0 days.

(21) Appl. No.: 15/822,395

(22) Filed: Nov. 27, 2017

(51) Int. Cl.
*G08G 5/02* (2006.01)
*B64D 45/04* (2006.01)

(52) U.S. Cl.
CPC ............. *G08G 5/025* (2013.01); *B64D 45/04* (2013.01)

(58) Field of Classification Search
CPC ...... G08G 5/025; G08G 5/045; G01S 13/913; G01S 13/9303; B64D 45/04
USPC ........................................ 340/971
See application file for complete search history.

(56) References Cited

U.S. PATENT DOCUMENTS

| | | | |
|---|---|---|---|
| 6,614,397 B2 * | 9/2003 | Pullen | G08G 5/0065 340/945 |
| 7,363,145 B2 | 4/2008 | Conner et al. | |
| 9,293,052 B2 * | 3/2016 | Conner | G05D 1/0077 |
| 2005/0128129 A1 * | 6/2005 | Conner | G01S 19/15 342/36 |
| 2016/0247406 A1 * | 8/2016 | Khatwa | G05D 1/0061 |

FOREIGN PATENT DOCUMENTS

WO 03077224 A1 9/2003

* cited by examiner

*Primary Examiner* — Eric M Blount
(74) *Attorney, Agent, or Firm* — Lorenz & Kopf, LLP (57) ABSTRACT

An enhanced runway awareness system and method directed to reducing audible alerts during runway selection is provided. The runway awareness system includes a navigation system, an audio system, and a control module. The control module receives and processes, from the navigation system, aircraft state data and runway position and location data. The control module determines that (a) the aircraft is approaching a first runway, and commands the audio system to emit an approach alert associated with (a); subsequent to commanding the audio system to emit the approach alert associated with (a), the control module prohibits the audio system from emitting an "on runway" alert associated with (a) responsive to determining that (b) the aircraft is on the first runway.

20 Claims, 7 Drawing Sheets

AIRCRAFT SYSTEMS AND METHODS FOR MANAGING RUNWAY AWARENESS AND ADVISORY SYSTEM (RAAS) CALLOUTS

TECHNICAL FIELD

The present invention generally relates to aircraft runway awareness systems, and more particularly relates to callouts (audible alerts) generated by runway awareness and advisory systems (RAAS).

BACKGROUND

Aircraft runway awareness and advisory systems (RAAS) are a category of aircraft runway awareness systems that are directed to aircraft taxing operations, defined as when the aircraft is traveling on the ground. In some taxiing operations, the aircraft may be approaching one or more runways, and must select the correct runway from among them. In addition, the aircraft must enter the correct runway with the appropriate heading or orientation. These taxiing operations can be very cognitively demanding. Adding to the cognitive demand of runway selection, there are often multiple audible alerts and callouts from multiple sources, happening closely together at this time. For example, audible alerts responsive to a conventional aircraft runway awareness system may overlap and interfere with audible alerts from air traffic control (ATC). When audible alerts overlap, it can be very cognitively demanding for a crew to isolate the most critical information.

Accordingly, improvements to conventional runway awareness systems that reduce cognitive demand during runway selection are desirable. Specifically, technologically improved runway awareness and advisory systems and methods that reduce unnecessary callouts and alerts are desirable. Furthermore, other desirable features and characteristics of the present disclosure will become apparent from the subsequent Detailed Description and the appended claims, taken in conjunction with the accompanying drawings and this Background.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In an embodiment, a runway awareness method for an aircraft is provided. The method comprising: receiving, from a navigation system, aircraft state data; receiving, from a navigation database, runway position and location data; processing aircraft state data and runway position and location data to determine that (a) the aircraft is approaching a first runway, responsive to determining (a), commanding an audio system to emit an approach alert associated with (a); subsequent to commanding the audio system to emit the approach alert associated with (a), determining that (b) the aircraft is on the first runway; and prohibiting the audio system from emitting an "on runway" alert associated with (a) responsive to determining (b).

Also provided is an enhanced runway awareness system for an aircraft, the system comprising: a navigation system; an audio system; and a control module coupled to the navigation system and the audio system, the control module configured to: receive, from the navigation system, aircraft state data and runway position and location data; process the aircraft state data and runway position and location data to determine that (a) the aircraft is approaching a first runway, responsive to determining (a), command an audio system to emit an approach alert associated with (a); subsequent to commanding the audio system to emit the approach alert associated with (a), determine that (b) the aircraft is on the first runway; and prohibit the audio system from emitting an "on runway" alert associated with (a) responsive to determining (b).

An aircraft is also provided. The aircraft comprising: an audio system; and a runway awareness system coupled to the audio system, the runway awareness system comprising a navigation system and configured to: process aircraft state data and runway position and location data to determine that (a) the aircraft is approaching a first runway, responsive to determining (a), command the audio system to emit an approach alert associated with (a); subsequent to commanding the audio system to emit the approach alert associated with (a), determine that (b) the aircraft is on the first runway; and prohibit the audio system from emitting an "on runway" alert associated with (a) responsive to determining (b).

Furthermore, other desirable features and characteristics of the system and method will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention that is defined by the claims. Furthermore, there is no intention to be bound by any theory presented in the preceding background or the following detailed description.

As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality. The provided system and method may take the form of a control module (FIG. 1, 104), and may be separate from, or integrated within, a preexisting mobile platform management system, avionics system, or aircraft flight management system (FMS).

Exemplary embodiments of the disclosed control module (FIG. 1, 104) for runway selection deliver a technological improvement over a conventional runway awareness and advisory system (RAAS) (FIG. 2 102), by processing and generating additional information and conditionally controlling audible and visual alerts based thereon. Specifically, an algorithm embodied in a program (FIG. 1, 162) in the control module 104 compares and processes the conditions of (1) a runway that the aircraft has entered, (2) a heading of the aircraft on the runway that it has entered, and (3) components of a previously determined approach alert. Based on whether or not there is a match, the control module 104 either commands the audio system (FIG. 1, 132) to emit an "on runway" alert or prohibits the audio system 132 from emitting an "on runway" alert.

Figure 1:
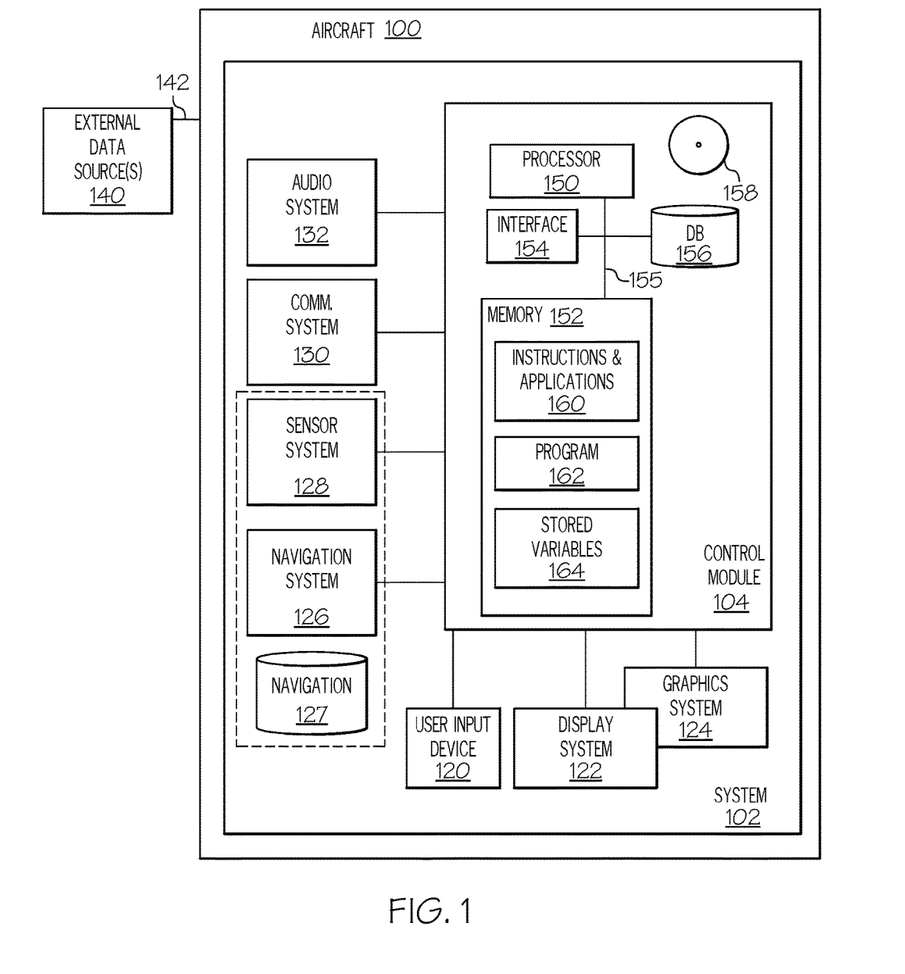
FIG. 1 is a block diagram of an enhanced system for runway awareness, according to an exemplary embodiment.

Turning now to FIG. 1, a functional block diagram of an aircraft 100 including an enhanced RAAS 102 (also referred to herein as "system" 102) employing the control module 104. In the depicted embodiment, the system 102 includes: the control module 104 that is operationally coupled to an audio system 132, a communication system 130, a sensor system 128, a navigation system 126, a navigation database 127, a user input device 120, a display system 122, and a graphics system 124. The operation of these functional blocks is described in more detail below.

In the described embodiments, the depicted control module 104 is generally realized within a technologically enhanced RAAS of an aircraft 100; however, the concepts presented here can be deployed in a variety of mobile platforms, spacecraft, and the like. Accordingly, in various embodiments, rather than enhancing a RAAS, the control module 104 may reside elsewhere and/or enhance part of larger aircraft runway awareness system, avionics management system, or aircraft management system. Further, it will be appreciated that the system 102 may differ from the embodiment depicted in FIG. 1. For example, the sensor system 128, the navigation system 126, and the navigation database 127, may be part of a flight management system (FMS), vehicle management system, or aircraft flight deck display system.

In the illustrated embodiment, the control module 104 is coupled to the communications system 106, which is configured to support communications via communications link 142, between external data source(s) 140 and the aircraft. External source(s) 140 may comprise air traffic control (ATC), or other suitable command centers and ground locations. Communications link 142 may be wireless, utilizing one or more industry-standard wireless communication protocols. Non-limiting examples of data received from the external source(s) 140 includes, for example, instantaneous (i.e., real time or current) air traffic control (ATC) communications, automatic dependent surveillance broadcast (ADS-B) data, and weather communications. In addition, a flight plan may be loaded or programmed into the system 102 from an external data source 140. In this regard, the communications system 106 may be realized using a radio communication system or another suitable data link system.

The sensor system 128 comprises a variety of different sensors, each directed to sensing a respective different aspect of the aircraft 100 while in flight. Non-limiting examples of sensors include: inertial reference sensors capable of obtaining or otherwise determining the attitude or orientation (e.g., the pitch, roll, and yaw, heading) of the aircraft 100 relative to earth; wind direction and velocity sensors, fuel-level sensors, engine temperature sensors, system status sensors for systems such as brakes, flaps, lights, and the like. Real-time aircraft sensor data includes, but is not limited to: aircraft location, position, orientation, attitude, and altitude.

Navigation system 126 is configured to provide real-time navigational data and/or information regarding position determination and operation of the aircraft. The navigation system 126 may be realized as a global positioning system (GPS), inertial reference system (IRS), or a radio-based navigation system (e.g., VHF Omni-directional radio range (VOR) or long range aid to navigation (LORAN)), and may include one or more navigational radios or other sensors suitably configured to support operation of the navigation system 126, as will be appreciated in the art. The navigation system 126 is capable of obtaining and/or determining the current or instantaneous aircraft position and location data (e.g., the current latitude, longitude, heading, and the like) and the current altitude or above ground level for the aircraft. In some embodiments, the inertial reference sensors described in connection with the sensor system 128 are included within the navigation system 126. In some embodiments, a navigation database 127 is integrated into the navigation system 126. The navigation database 127 may comprise waypoint information, airport features information, runway position and location data, holding patterns, flight procedures, approach procedures, and various flight planning and distance measuring rules and parameters. Accordingly, in various embodiments, "navigation data" may comprise data and information from the navigation database as well as positioning information from the navigation system, and sensor data from the sensor system 128. Under direction of the instructions and applications 160, the control module 104 may process navigation data and sensor data to determine an aircraft instantaneous position and guide the aircraft along a flight plan.

The user input device 120 is coupled to the control module 104, and the user input device 120 and the control module 104 are cooperatively configured to allow a user (e.g., a pilot, co-pilot, or crew member) to interact with the display system 122 and/or other elements of the system 102 in a conventional manner. The user input device 120 may include any one, or combination, of various known user input device devices including, but not limited to: a touch sensitive screen; a cursor control device (CCD) (not shown), such as a mouse, a trackball, or joystick; a keyboard; one or more buttons, switches, or knobs; a voice input system; and a gesture recognition system. In embodiments using a touch sensitive screen, the user input device 120 may be integrated with a display device in display system 122. Non-limiting examples of uses for the user input device 120 include: entering values for stored variables 164, loading or updating instructions and applications 160, and loading and updating the contents of the database 156, each described in more detail below. In addition, pilots or crew may enter flight plans, Standard Operating Procedures (SOP), and the like, via the user input device 120.

The control module 104 is configured to generate commands that direct the renderings of the display system 122, and the audible alerts from the audio system 132. The audio system 114 may comprise any combination of speakers, bells, or alarms sufficient to generate sound that the crew can hear. The audio system 114 may receive commands from the control module 104 and convert the commands into emitted sounds. Accordingly, the audio system 114 may comprise a means for converting the commands into emitted sounds.

The renderings of the display system 122 may be processed, at least in part, by the graphics system 124. In some embodiments, the graphics system 124 may be integrated within the control module 104; in other embodiments, the graphics system 124 may be integrated within the display system 122. Regardless of the state of integration of these subsystems, responsive to receiving display commands from the control module 104, the display system 122 displays, renders, or otherwise conveys one or more graphical representations or displayed images associated with operation of the aircraft 100, as described in greater detail below. In various embodiments, images displayed on the display system 122 may also be responsive to processed user input that was received via a user input device 120.

In general, the display system 122 may include any device or apparatus suitable for displaying flight information or other data associated with operation of the aircraft in a format viewable by a user. Display methods include various types of computer generated symbols, text, and graphic information representing, for example, pitch, heading, flight path, airspeed, altitude, runway information, waypoints, targets, obstacle, terrain, and required navigation performance (RNP) data in an integrated, multi-color or monochrome form. In practice, the display system 122 may be part of, or include, a primary flight display (PFD) system, a panel-mounted head down display (HDD), a head up display (HUD), or a head mounted display system, such as a "near to eye display" system. The display system 122 may comprise display devices that provide three dimensional or two dimensional images, and may provide synthetic vision imaging. Non-limiting examples of such display devices include cathode ray tube (CRT) displays, and flat panel displays such as LCD (liquid crystal displays) and TFT (thin film transistor) displays. Accordingly, each display device responds to a communication protocol that is either two-dimensional or three, and may support the overlay of text, alphanumeric information, or visual symbology.

As mentioned, the control module 104 performs the functions of the system 102. With continued reference to FIG. 1, within the control module 104, the processor 150 and the memory 152 (having therein the program 162) form a novel processing engine that performs the described processing activities in accordance with the program 162, as is described in more detail below.

The control module 104 includes an interface 154, communicatively coupled to the processor 150 and memory 152 (via a bus 155), database 156, and an optional storage disk 158. In various embodiments, the control module 104 performs actions and other functions in accordance with steps of a method 600 described in connection with FIG. 4. The processor 150 may comprise any type of processor or multiple processors, single integrated circuits such as a microprocessor, or any suitable number of integrated circuit devices and/or circuit boards working in cooperation to carry out the described operations, tasks, and functions by manipulating electrical signals representing data bits at memory locations in the system memory, as well as other processing of signals.

The memory 152, the navigation database 127, the database 156, and optional disk 158 maintain data bits and may be utilized by the processor 150 as both storage and a scratch pad. The memory locations where data bits are maintained are physical locations that have particular electrical, magnetic, optical, or organic properties corresponding to the data bits. The memory 152 can be any type of suitable computer readable storage medium. For example, the memory 152 may include various types of dynamic random access memory (DRAM) such as SDRAM, the various types of static RAM (SRAM), and the various types of non-volatile memory (PROM, EPROM, and flash). In certain examples, the memory 152 is located on and/or co-located on the same computer chip as the processor 150. In the depicted embodiment, the memory 152 stores the above-referenced instructions and applications 160 along with one or more configurable variables in stored variables 164. The database 156 and the disk 158 are computer readable storage media in the form of any suitable type of storage apparatus, including direct access storage devices such as hard disk drives, flash systems, floppy disk drives and optical disk drives. The database 156 may include an airport database (comprising airport features) and a terrain database (comprising terrain features), parameters and instructions for runway detection and selection, and parameters and instructions for generating alerts as described herein. In combination, the features from the airport database and the terrain database are referred to as map features. Information in the database 156 may be organized and/or imported from an external data source 140 during an initialization step of a process (see initialization 701 FIG. 7).

The bus 155 serves to transmit programs, data, status and other information or signals between the various components of the control module 104. The bus 155 can be any suitable physical or logical means of connecting computer systems and components. This includes, but is not limited to, direct hard-wired connections, fiber optics, infrared and wireless bus technologies.

The interface 154 enables communications within the control module 104, can include one or more network interfaces to communicate with other systems or components, and can be implemented using any suitable method and apparatus. For example, the interface 154 enables communication from a system driver and/or another computer system. In one embodiment, the interface 154 obtains data from external data source(s) 140 directly. The interface 154 may also include one or more network interfaces to communicate with technicians, and/or one or more storage interfaces to connect to storage apparatuses, such as the database 156.

During operation, the processor 150 loads and executes one or more programs, algorithms and rules embodied as instructions and applications 160 contained within the memory 152 and, as such, controls the general operation of the control module 104 as well as the system 102. In executing the process described herein, such as the method 700 of FIG. 7, the processor 150 specifically loads and executes the instructions embodied in the novel program 162. Additionally, the processor 150 is configured to, in accordance with the program 162: process received inputs (selectively, any combination of input from the set including: external data sources 140, the communication system 130, the sensor system 128, the navigation system 126, and the user input device 120); reference any of the databases (such as, the navigation database 127, and the database 156); generate display commands that command and control the display system 122; and, generate audio commands to command and control the audio system 132.

Generally, the control module 104 continuously monitors received inputs to determine a current aircraft state, wherein aircraft state data includes: a present position, location, heading, orientation, and trajectory of the aircraft 100. The current aircraft state is processed with airport features information from the navigation database 127 to determine that the aircraft is approaching a runway, identify the runway, and to determine an associated approach direction. A predetermined time delay (td) may be employed; if the aircraft 100 does not enter a runway in less than or equal to td, the control module 104 may reset, or may generate an associated alert. The magnitude of td may be a function of aircraft specific parameters and/geometries associated with the airport features.

Figure 2:
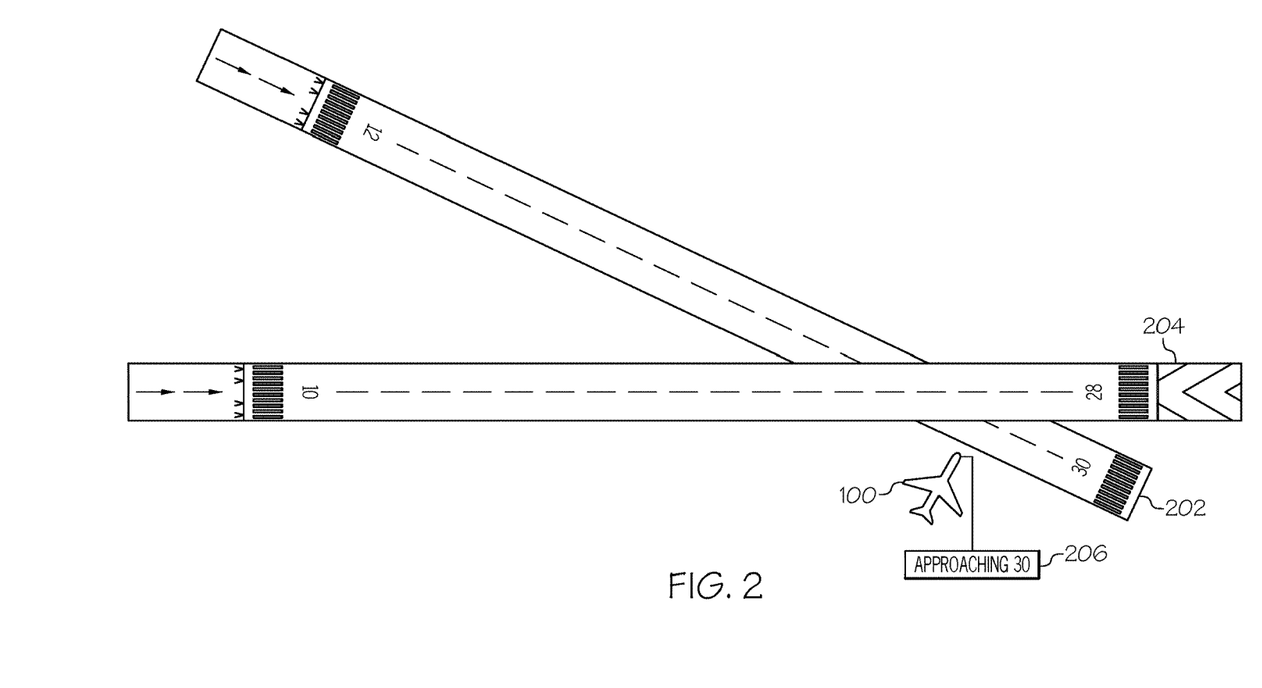
FIG. 2 is an image depicting an aircraft approaching a runway, and an associated approach alert, in accordance with an exemplary embodiment.

Referring now to FIG. 2, aircraft 100 is depicted as approaching an entrance to a first runway 202 (runway 30) and an entrance to a second runway 204 (runway 28). An aircraft 100 is determined to be approaching a given runway when the aircraft state data (specifically, a heading of the aircraft 100, and its associated trajectory, moving forward) indicate an impending intersection with a boundary of the given runway. The control module processes aircraft position and location data with runway position and location data to determine that the aircraft 101 is approaching a first runway 202. In scenarios in which the runways are close to each other, or overlapping, as shown in FIG. 2, the control module 104 issues an approach alert, or callout, for the first detected runway (also referred to as the nearest runway, using distance measuring algorithms). As shown in FIG. 2, the nearest runway to the heading of aircraft 100 is the first runway 202 (runway 30). Responsive to determining that aircraft 100 is approaching the first runway 202, the control module 104 may command the audio system 132 to emit an audible RAAS approach alert 206, such as, "approaching 30." Concurrently, the control module 104 may command the display system 122 to generate a text or graphical alert providing the same information ("approaching 30").

Figure 3:
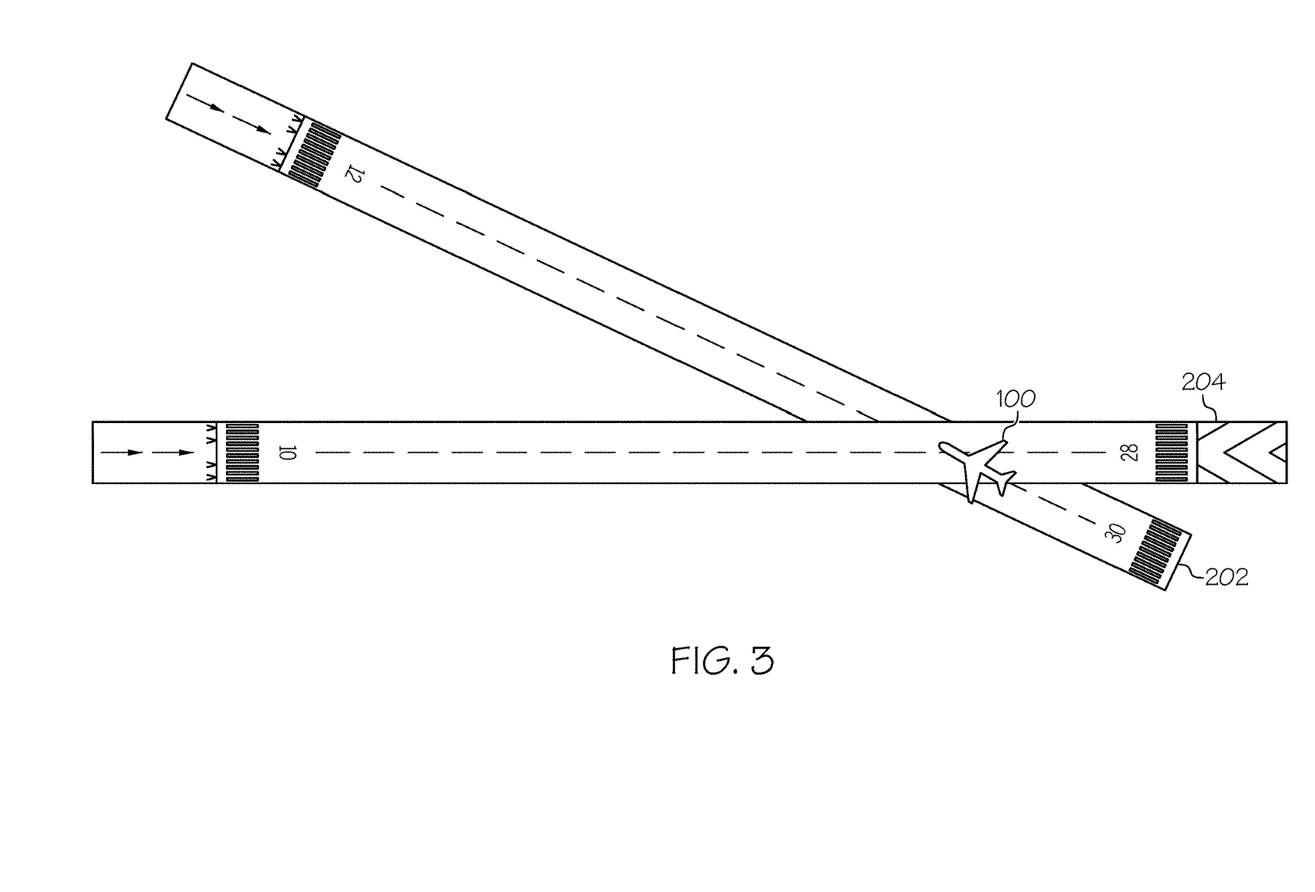
FIG. 3 is an image depicting the aircraft of FIG. 2, subsequent to the approach alert, the aircraft on the runway matching the approach alert, in accordance with an exemplary embodiment.

In FIG. 3, aircraft 100 is shown on the first runway 202 (runway 30). As may be noted, even though the second runway 204 (runway 28) has an entrance near to the entrance to the first runway 202, the aircraft entered, or "got on" the first runway 202, which was called out in the RAAS approach alert 206. Determining that the aircraft 100 is "on" the runway comprises determining that an aircraft heading is within about plus or minus 20 degrees from a runway centerline. A location of the runway centerline may be found in the airport features stored in the navigation database 127.

In various embodiments, the timing of when the aircraft 100 enters the runway is significant. When the aircraft 100 enters the runway, a configurable predetermined time delay, td, may be employed, as follows. The td is referenced or retrieved from a memory location. Subsequent to a RAAS approach alert 206 being issued, a timer in the control module 104 begins to measure the elapsed time and compare the elapsed time to td. When the aircraft 100 enters a runway in less than, or equal to, td, the control module 104 determines whether the runway that the aircraft 100 is on (i.e., has entered) matches the runway that was called out in an earlier respective RAAS approach alert 206. If there is a match, the control module 104 prohibits the audio system 132 from emitting an associated RAAS "on runway" alert. In contrast, when, in less than or equal to td after the RAAS approach alert 206 was issued, the control module 104 determines that the runway that the aircraft 100 is on does not match the runway that was called out in the RAAS approach alert 206, the control module 104 commands the audio system 132 to emit an associated RAAS "on runway" alert. In an embodiment, td is 60 seconds.

Figure 4:
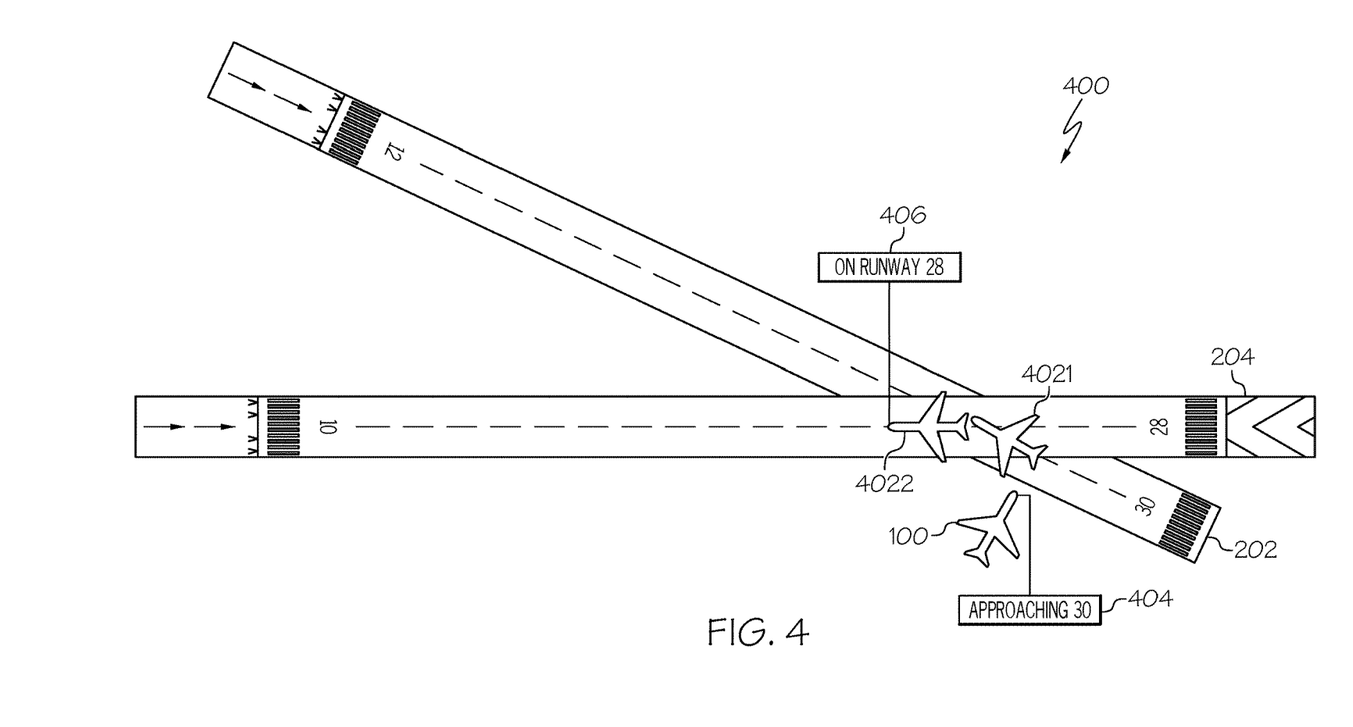
FIG. 4 is an image depicting the aircraft of FIG. 2 approaching a runway, an approach alert, and two possible scenarios subsequent to the approach alert, in accordance with an exemplary embodiment.

Turning now to image 400, in FIG. 4, the above described scenarios are illustrated. In the first scenario, aircraft 100 approaches the first runway 202 and an audible RAAS approach alert 404 "approaching 30" is emitted by audio system 132. An associated RAAS approach alert may be displayed by display system 122. Subsequent to the RAAS approach alert 404, if aircraft 100 enters the first runway 202, as shown by the aircraft 4021 position in less than the predetermined configurable time delay (td), a subsequent audible RAAS "on runway" alert, that is associated with the first runway 202, is prohibited. However, if, subsequent to the RAAS approach alert 404, and within td, the aircraft 100 enters the second runway 204, as shown by the aircraft 4022 position, the control module 104 may command the audio system 132 to emit a subsequent RAAS "on runway" alert. The emitted "on runway alert" is associated with the second runway 204, i.e., "on runway 28" 406; an associated RAAS "on runway" alert may also be displayed by the display system 122.

When multiple runways are close together, the control module 104 associates an approach alert with a runway determined to be the closest runway to the nose of the aircraft 101. Specifically, the control module is configured to determine an approach runway based on an interception point of a nose of the aircraft 101 with the respective runway. Further, a single runway feature often has a first runway name if it's used (i.e., the aircraft 101 moves along it) in a first direction, and a second runway name if used in a second direction. See for example, FIGS. 2-4, a runway object having runway name 30 and runway name 12) In these scenarios, the control module 104 still determines an approach runway based on an interception point of a nose of the aircraft 101 with the respective runway; the approach alert is associated with the runway determined to be the closest runway to the nose of the aircraft 101, as is illustrated in FIGS. 5 and 6.

Figure 5:
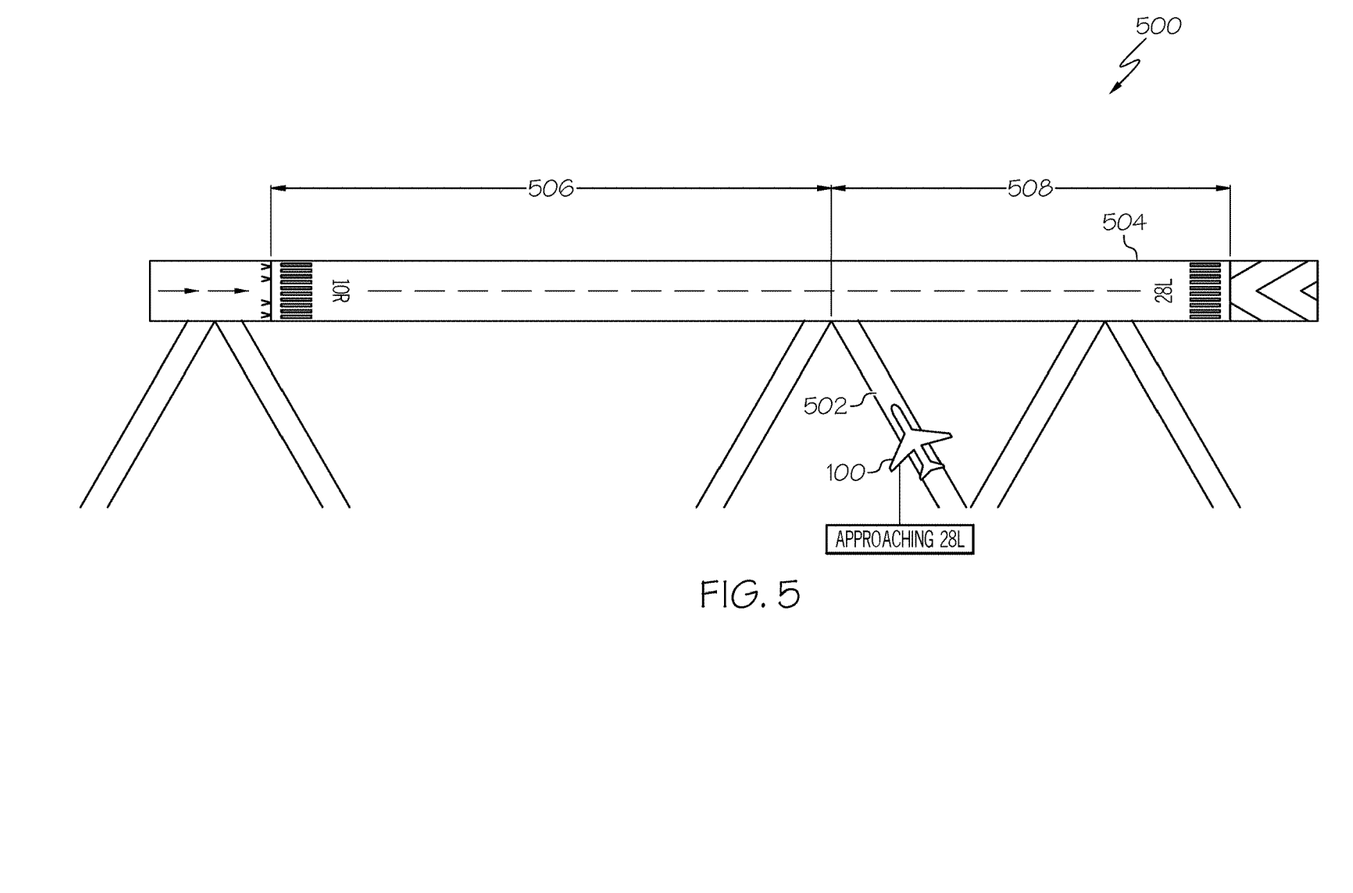
FIG. 5 is an image depicting the aircraft of FIG. 2 approaching a runway obliquely, and an approach alert, in accordance with an exemplary embodiment.
Figure 6:
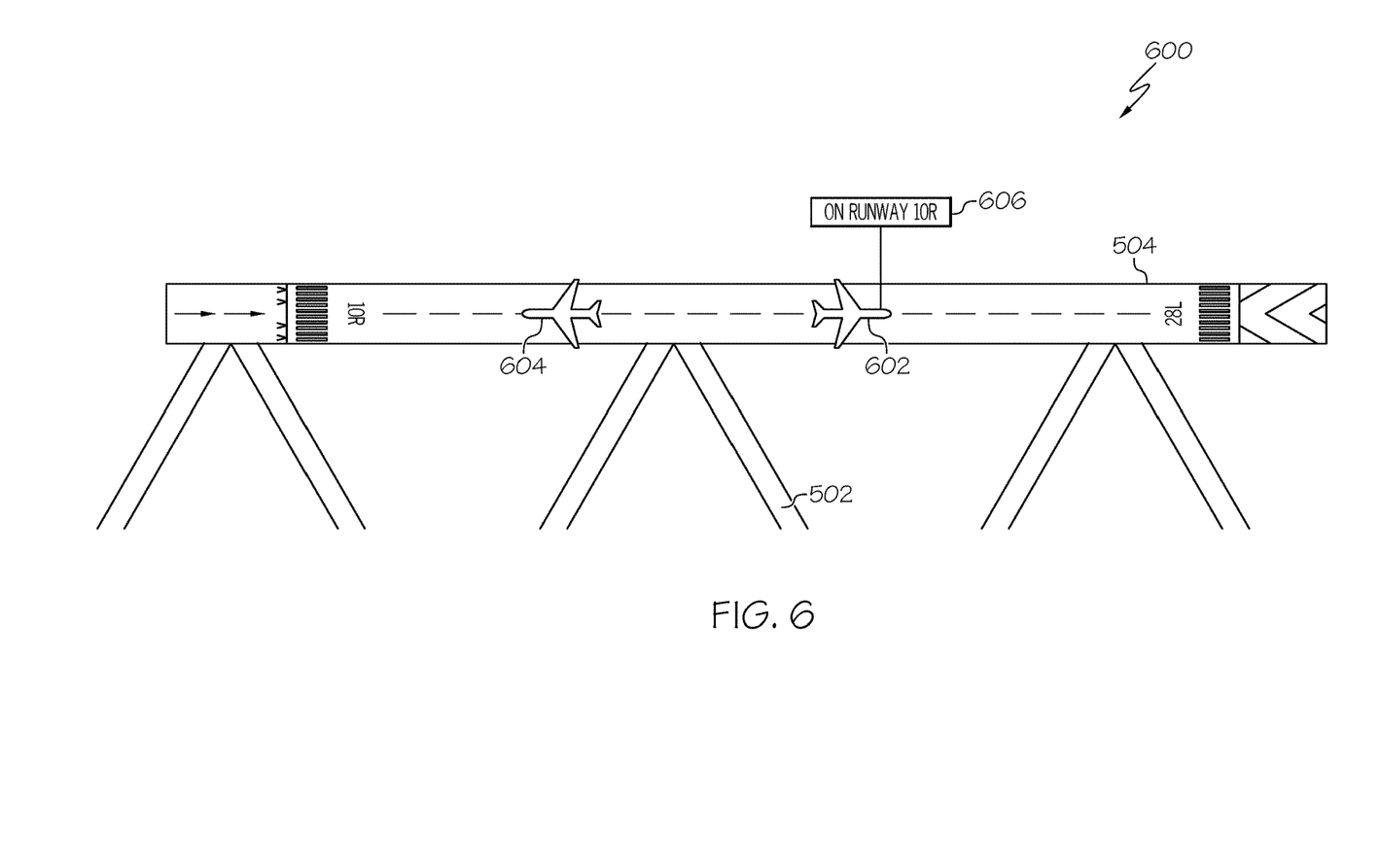
FIG. 6 is an image depicting two possible scenarios subsequent to the approach alert depicted in FIG. 5, in accordance with an exemplary embodiment.

In FIGS. 5 and 6, a runway feature shown is named runway 10R if the aircraft 101 moves along it to the right and named runway 28 L if the aircraft 101 moves along it to the left. In FIG. 5, an intercept point of the (nose of) the aircraft 100 is closest to the entrance to runway 28L (i.e., the distance 508 is smaller than the distance 506), therefore, the control module 104 associates runway 28L with an approach alert. However, if, an intercept point of the (nose of) the aircraft 100 was closer to the entrance to runway 10R (i.e., if 506 were smaller than 508) the control module 104 associates runway 10R with the approach alert. Subsequent to determining the runway for the approach alert, the control module 104 can determine whether and when the following conditions are concurrent: (a) that the aircraft is on the runway of the approach alert; and (b) that a heading direction of the aircraft matches the runway of the approach alert. The control module 104 determined that the aircraft 101 is approaching runway 28L. Responsive thereto, the control module 104 has commanded the audio system 132 to emit an approach alert 510, "approaching 28L." Subsequent to approach alert 510, the aircraft 100 may enter the runway feature comprising 10R and 28L, with a heading of the aircraft 101 to the left, as shown by aircraft position 604. When aircraft 100 is on the first runway 504 and traveling with a heading direction that matches the approach direction from the approach alert 510, the control module 104 prohibits the audio system 132 from emitting an "on runway" alert. In contrast, when aircraft 100 is on the first runway 504 and traveling with a heading direction that does not match the approach direction from the approach alert 510, (as shown with aircraft position 602) the control module 104 commands the audio system 132 to emit an "on runway" alert 606, "on runway –10R."

Figure 7:
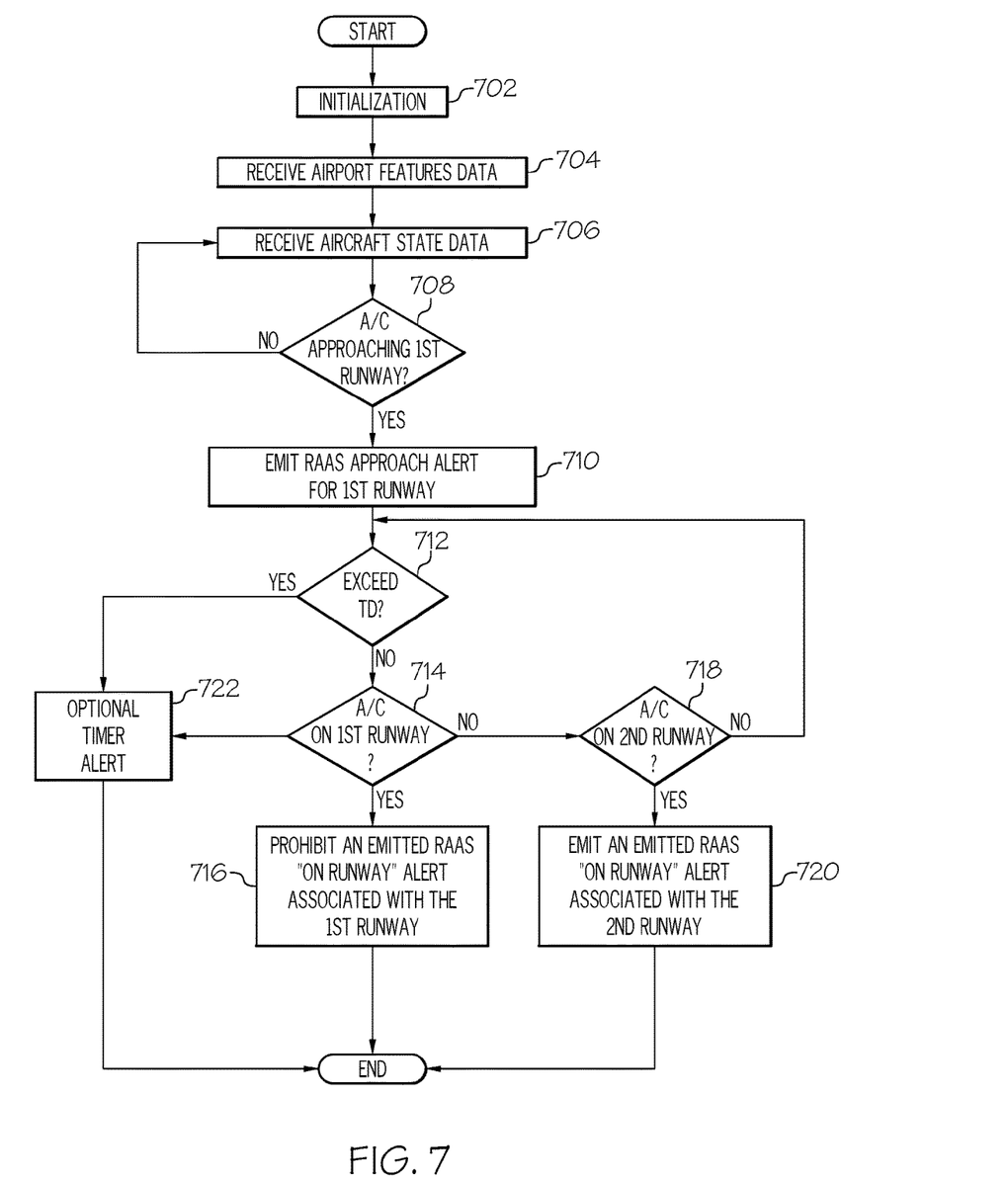
FIG. 7 is a flow chart for a method for enhanced runway awareness, according to an exemplary embodiment.

In a further exemplary embodiment, the control module 104 discussed above may be used to implement an enhanced runway advisory method 700, as shown in the flow chart of FIG. 7. For illustrative purposes, the following description of method 700 may refer to elements mentioned above in connection with FIG. 1. In practice, portions of method 700 may be performed by different components of the described system. It should be appreciated that method 700 may include any number of additional or alternative tasks, the tasks shown in FIG. 7 need not be performed in the illustrated order, and method 700 may be incorporated into a more comprehensive procedure or method having additional functionality not described in detail herein. Moreover, one or more of the tasks shown in FIG. 7 could be omitted from an embodiment of the method 600 as long as the intended overall functionality remains intact.

The method starts, and at 702 the control module 104 is initialized. As mentioned above, initialization may comprise uploading or updating instructions and applications 160, program 162, stored variables 164, and the various lookup tables stored in the database 156. Examples of parameters that may be stored in stored variables 164 include: a configurable predetermined delay time (td), parameters used by the instructions and applications 160 and the program 162, and the like. Stored variables 164 may also include various shapes, sizes, and color rendering references for flight images, buttons and displays such as employed on a graphical user interface (GUI) displayed on the display system 122. In some embodiments, the program 162 includes additional instructions and rules for commanding various audio system 132 devices such as speakers and alarms.

At 704, airport features data is received. As mentioned above, airport features data includes runway position and location information, and may be stored in the navigation database 127. Prior to that, airport features data may be uploaded into the system 102 via an external data source 140. At 706, aircraft state data is received. Aircraft state data is continuously received, and the method continuously processes the aircraft state data to track the aircraft 100 with respect to a designated flight plan, and with respect to runways and other airport features. At 708, received inputs are processed to determine whether the aircraft 100 is approaching a first runway 202. If not, then the method returns to receive the aircraft state data at 706. If it is determined that the aircraft 100 is approaching a first runway 202, then, at 710, a RAAS approach alert associated with the first runway is emitted by the audio system 132.

At 712, a timer is employed to compare elapsed time to a configurable predetermined time delay, td. As long as td has not been exceeded, the process moves to 714 to determine whether the aircraft 100 is on the first runway 202. At 716, if the aircraft is on the first runway, a runway callout or RAAS "on runway" alert associated with the first runway 202 is prohibited. If the aircraft 100 is not on the first runway, the method checks whether the aircraft 100 is on a second runway 204 at 718. If the aircraft 100 is on the second runway and the elapsed time has not exceeded td, a RAAS callout, or "on runway" RAAS alert associated with the second runway is emitted by the audio system 132 at 720.

In various embodiments, when the timer indicates that the elapsed time has exceeded td, an optional timer alert may be generated at 722. From 716, 720, or 722, the method 700 may return to receiving aircraft state data at 706, or end. As is readily appreciated, the labels "first" and "second," with respect to runways, are utilized to distinguish between any two distinct runways. In FIGS. 2-4, these are runway 30 (first runway 202), and runway 28 (second runway 204). In a subsequent pass through the method, the first runway and second runway may be different runways altogether, and their orientation with respect to each other may be at angles, parallel, or partially overlapping.

Accordingly, the exemplary embodiments discussed above enable technologically improved runway awareness systems that reduce unnecessary callouts and alerts during runway selection.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A runway awareness method for an aircraft, the method comprising:
   receiving, from a navigation system, aircraft state data;
   receiving, from a navigation database, runway position and location data;
   processing aircraft state data and runway position and location data to determine that (a) the aircraft is approaching a first runway,
   responsive to determining (a), commanding an audio system to emit an approach alert associated with (a);
   subsequent to commanding the audio system to emit the approach alert associated with (a), determining that (b) the aircraft is on the first runway; and
   prohibiting the audio system from emitting an "on runway" alert associated with (a) responsive to determining (b).

2. The method of claim 1, further comprising determining that (b) has occurred less than or equal to a configurable predetermined time delay (td) after (a).

3. The method of claim 2, wherein prohibiting the audio system from emitting the "on runway" alert is further conditioned upon determining that (b) has occurred less than or equal to the configurable predetermined time delay (td) after (a).

4. The method of claim 3, further comprising, subsequent to commanding an audio system to emit an approach alert associated with (a), determining that (c) the aircraft is on a second runway.

5. The method of claim 4, further comprising commanding the audio system to emit an "on runway" alert associated with (c).

6. The method of claim 5, wherein determining that the aircraft is on the runway comprises determining that an aircraft heading is within about plus or minus 20 degrees from a runway centerline.

7. The method of claim 1, wherein determining that (a) the aircraft is approaching a first runway is based on an intercept point of a nose of the aircraft with the first runway.

8. An enhanced runway awareness system for an aircraft, the system comprising:
   a navigation system;
   an audio system; and
   a control module coupled to the navigation system and the audio system, the control module configured to:
   receive, from the navigation system, aircraft state data and runway position and location data;
   process the aircraft state data and runway position and location data to determine that (a) the aircraft is approaching a first runway,
   responsive to determining (a), command an audio system to emit an approach alert associated with (a);
   subsequent to commanding the audio system to emit the approach alert associated with (a), determine that (b) the aircraft is on the first runway; and
   prohibit the audio system from emitting an "on runway" alert associated with (a) responsive to determining (b).

9. The system of claim 8, wherein the control module is further configured to determine that (b) has occurred less than or equal to a configurable predetermined time delay (td) after (a).

10. The system of claim 9, wherein the control module is further configured to prohibit the audio system from emitting the "on runway" alert when (b) has occurred less than or equal to the configurable predetermined time delay (td) after (a).

11. The system of claim 10, wherein, subsequent to commanding the audio system to emit the approach alert associated with (a), the control module is further configured to determine that (c) the aircraft is on a second runway.

12. The system of claim 11, wherein the control module is further configured to command the audio system to emit an "on runway" alert associated with (c).

13. The system of claim 12, wherein the control module is further configured to determine that the aircraft is on the runway when an aircraft heading is within about plus or minus 20 degrees from a runway centerline.

14. The system of claim 13, wherein responsive to determining (a), the control module is further configured command a display system to render a visual alert associated with (a).

15. The system of claim 8, wherein the control module is further configured to determine (a) based on an intercept point of a nose of the aircraft with the first runway.

16. The system of claim 15, wherein the control module is further configured to prohibit the audio system from emitting an "on runway" alert associated with (a) upon determining that the heading direction of the aircraft on the first runway matches the approach direction.

17. An aircraft, comprising:
   an audio system; and
   a runway awareness system coupled to the audio system, the runway awareness system comprising a navigation system and configured to:
   process aircraft state data and runway position and location data to determine that (a) the aircraft is approaching a first runway,
   responsive to determining (a), command the audio system to emit an approach alert associated with (a);
   subsequent to commanding the audio system to emit the approach alert associated with (a), determine that (b) the aircraft is on the first runway; and
   prohibit the audio system from emitting an "on runway" alert associated with (a) responsive to determining (b).

18. The aircraft of claim 17, wherein the runway awareness system is further configured to determine (a) based on an interception of a nose of the aircraft with the first runway.

19. The system of claim 18, wherein the runway awareness system is further configured to determine a heading direction of the aircraft when an aircraft heading is within about plus or minus 20 degrees from a runway centerline.

20. The system of claim 15, further comprising a display system, and wherein the runway awareness system is further configured to command the display system to render a visual alert associated with (a).

\* \* \* \* \*